United States Patent [19]

Munker

[11] 4,250,782
[45] Feb. 17, 1981

[54] SHEAR WITH INCLINED GUIDES

[75] Inventor: Erich Munker, Kreuztal-Ferndo, Fed. Rep. of Germany

[73] Assignee: Schloemann-Siemag Aktiengesellschaft, Düsseldorf, Fed. Rep. of Germany

[21] Appl. No.: 96,483

[22] Filed: Nov. 21, 1979

Related U.S. Application Data

[63] Continuation-in-part of Ser. No. 873,149, Jan. 27, 1978, abandoned.

[30] Foreign Application Priority Data

Jan. 1, 1977 [DE] Fed. Rep. of Germany ....... 2703197

[51] Int. Cl.³ .............................................. B23D 23/00
[52] U.S. Cl. ........................................ 83/376; 83/380; 83/626; 83/638; 83/454
[58] Field of Search .................. 83/376, 380, 454, 459, 83/626, 638

[56] References Cited

U.S. PATENT DOCUMENTS

| 97,816 | 12/1869 | Robinson | 83/376 |
| 995,252 | 6/1911 | John | 83/638 |
| 1,515,013 | 11/1924 | DeCosta | 83/376 |
| 1,561,022 | 11/1925 | Rapp | 83/638 |
| 2,667,922 | 2/1954 | Hill et al. | 83/376 |
| 3,391,591 | 7/1968 | Funke | 83/638 |

FOREIGN PATENT DOCUMENTS 2526199 4/1976 Fed. Rep. of Germany .

Primary Examiner—Donald R. Schran
Attorney, Agent, or Firm—Norman S. Blodgett; Gerry A. Blodgett

[57] ABSTRACT

A shear comprising a lower fixed blade beam mounted within a frame, a guide carrier guided for vertical movement in the frame and an upper blade carrier rigidly attached to the guide carrier by releasable connecting means for concurrent vertical movement with the guide carrier. The blade carrier is reciprocated by drive means which lowers the blade and guide carriers to a lower position where the upper and lower blade beams are cooperatively opposed on opposite sides of a workpiece to begin a shearing operation. Inclined guide surfaces are provided on the guide and blade carriers for allowing the blade carrier to move obliquely with respect to the guide carrier upon release of the rigid attachment between the two carriers to perform a shearing operation.

10 Claims, 6 Drawing Figures

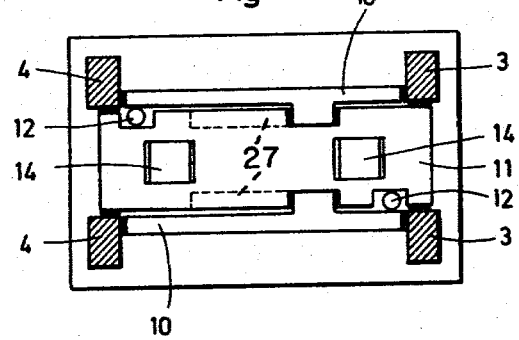
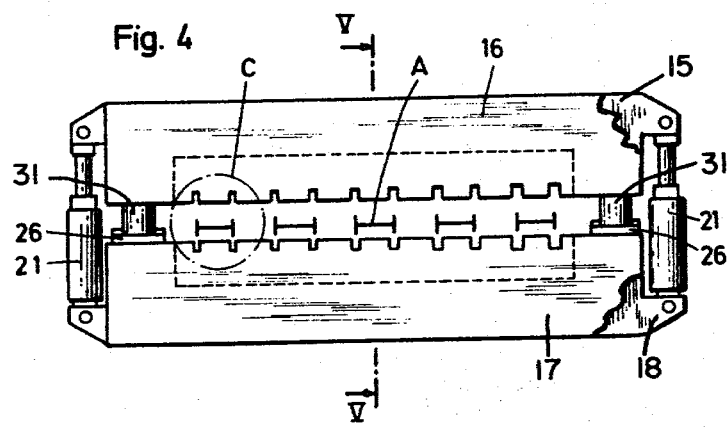
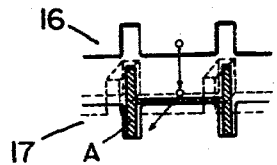
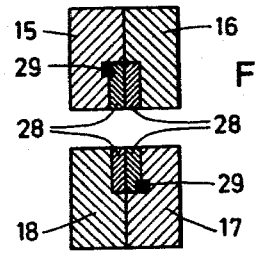

SHEAR WITH INCLINED GUIDES

RELATIONSHIP TO CO-PENDING APPLICATIONS

This application is a continuation-in-part of patent application Ser. No. 873,149 filed Jan. 27, 1978 now abandoned.

BACKGROUND OF THE INVENTION

Shears of this kind are shown in German Pat. No. DT-OS 25 26 199 with two to four formed blades that are disposed in a fixed lower blade carrier, a movably-mounted lower blade carrier, and two movable upper blade carriers. On this known shear, the blade carriers, which perform the oblique cut, are interconnected through a center of rotation in a manner that is disadvantageous because it impairs the efficiency of the cut. In the known shear it must also be considered a disadvantage that, as a support for the blade carriers, swing elements are arranged at the lower blade carriers, of which at least one swing element is variable in length.

It is, therefore, an outstanding object of the invention to provide a shear of the type described that avoids the cited disadvantages with which a burr-free cut is achieved, so that reworking that would otherwise be necessary can be eliminated.

This and other difficulties experienced with the prior art devices have been obviated in a novel manner by the present invention.

With this and other objects in view, as will be apparent to those skilled in the art, the invention resides in the combination of parts set forth in the specification and covered by the claims appended hereto.

SUMMARY OF THE INVENTION

In general, the present invention consists of a shear having an upper blade carrier which is vertically guided in the shear columns and is releasably connected to guide carriers that are non-positively arranged at both sides of the upper blade carrier. In this way, the upper blade carrier that is provided with an upper blade beam rests, during the vertical movement, on downwardly-sloping guide surfaces of the guide carriers and another upper blade beam is arranged for vertical movement beside the first blade beam by means of piston-cylinder units. Below these blade beams are located, in a blade table, lower blade beams. Preferably, the upper blade carrier is releasably connected to the guide carriers through two diagonally opposing piston-cylinder units and the upper blade carrier is connected to additional piston-cylinder units that are mounted on the shear columns.

More specifically, one of the upper blade beams is also clamped to the upper blade carrier and one of the lower blade beams to the blade table by means of spring-tension cylinders. Preferably, the guide surfaces of the guide carriers and the guide surfaces of the upper blade carrier lying opposite to these guide surfaces lie at an angle of 35° to 45° to the vertical. In an advantageous manner, it is further provided that one of the lower blade beams is cushioned and supported for vertical adjustment through piston-cylinder units, while the other lower blade beam is rigidly supported.

In a further development of the shear of the invention, the upper blade beams are also raised and lowered by means of piston-cylinder units mounted on the lower blade beams. In the preferred embodiment of the shear of the invention cylindrical guides are provided between one of the upper blade beams and the oppositelying lower blade beam. These guides consist of guide bolts fastened in the blade beams, on which bolts the upper blade beams are guided by means of ball slides. To ensure proper transmission of force between the blades and the blade beams, the diagonally-located blade beams (which are not clamped to table and carrier) have a right-angled engaging ledge between blade beam and blade.

The invention finally provides for equipping the guide carriers with mechanically-or hydraulically-cushioned, adjustable stop; preferably mounted on the upper transverse spar.

It can be seen, then, that the shear of the invention has the particular advantage that there is now a shear available for the cutting of sections that provides as a result especially accurate and relatively burr-free cuts. This is achieved, in particular, through a rigid guiding of the upper blade carrier. In addition, the blades provide a large opening across the whole width of the shear for insertion of the section that is to be cut. By avoiding a center of rotation between the blade carriers, the number of machine parts that are subjected to wear is greatly reduced.

BRIEF DESCRIPTION OF THE DRAWINGS

The character of the invention, however, may be best understood by reference to one of its structural forms, as illustrated by the accompanying drawings, in which:

FIG. 3 is a horizontal sectional view taken on the line III—III of FIG. 2,

FIG. 4 is a side view of the blade beams on enlarged scale,

FIG. 5 is a vertical sectional view taken on the line V—V of FIG. 4, and

FIG. 6 is enlargement of the cutaway portion C of FIG. 4.

DESCRIPTION OF THE PREFERRED EMBODIMENT

Figure 1:
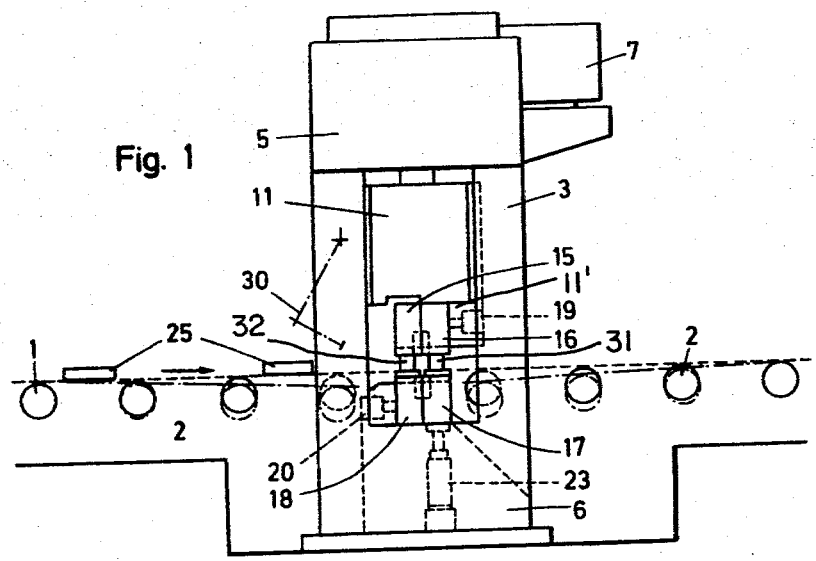
FIG. 1 is a side elevational view of a shear embodying the principles of the invention.
Figure 2:
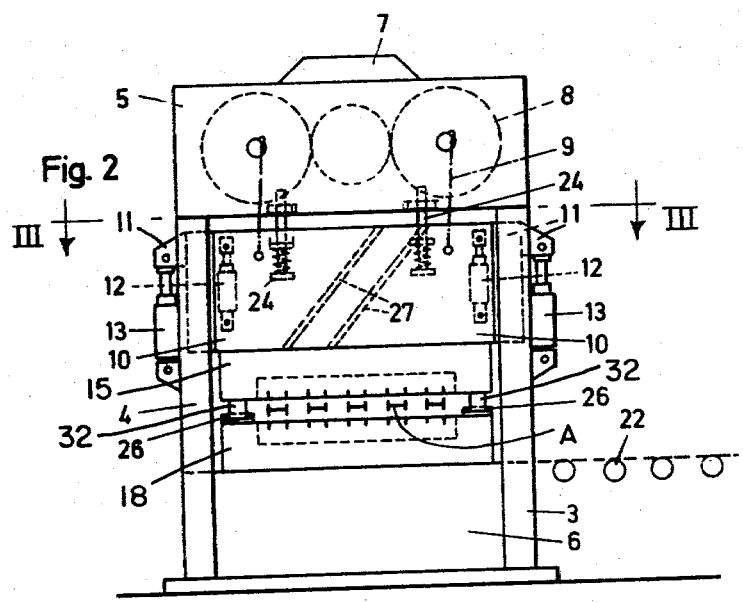
FIG. 2 is a front elevational view of the shear.

FIGS. 1 and 2 of the drawing shows a shear that is located between two vertically-movable tilting roller tables 1, 2, following a cooling bed (not shown) within a delivery table train. The frame of the shear consists of the two shear columns 3, 4, and the transverse spars 5, 6 which connect them.

The upper transverse spar 5 carries a drive motor 7 and the gearing, of which crank drives 8 and the adjoining connecting rods 9 are shown by way of suggestion. The lower transverse spar 6 is designed as a blade table.

The guide carriers 10 are arranged within the shear columns 3, 4, which carriers guide an upper blade carrier 11 (FIG. 3). The upper blade carrier 11 is releasably connected to the guide carriers 10 by means of two diagonally-located piston-cylinder units 12. The blade carrier 11 is balanced by means of additional piston-cylinder units 13 which are pivotally connected (on the one hand) with respective shear columns 3, 4 and (on the other hand) pivotally connected to the blade carrier 11. Furthermore, the motion of the blade carrier 11 is determined by the crank drives 8 with which it is connected via the associated connecting rods 9 in bearings 14.

The two upper blade beams 15, 16 are mounted on the upper blade carrier 11, while in the lower transverse spar 6, the blade table, are provided the lower blade beams 17, 18, lying opposite the blade beams 15, 16. The primary upper blade beam 16 is clamped to the upper blade carrier 11 by spring-tension cylinders 19 located in a downwardly-extending bracket 11 of the blade carrier 11 and the primary lower blade beam 18 (which lies opposite to the secondary upper blade beam 15) is clamped to the blade table 6, i.e., the lower transverse spar, by additional spring-tension cylinders 20 located in an upwardly-extending bracket 6 of table 6.

To exchange blade beams 15–16, the spring-tension cylinders 19, 20 are detached, the upper blade beams 15, 16 are lowered by means of piston-cylinder units 21 (which are laterally connected to the lower blade beams 17, 18) and are moved out together on a removal device 22 (cf. FIG. 2) through a lateral window of the shear column 3. The installation of new blade beams 15–18 is carried out in reverse order.

Additional piston-cylinder units 23 are located within the blade table 6 below the secondary lower blade beam 17 through which units the lower beam 17 is cushioned during a cut. The other lower blade beam 18 is rigidly supported below in the usual manner. It can however, likewise be supported through additional adjusting units, so that the possibility also exits for vertical adjustment of the lower blade beam 18.

Finally, as is evident in FIG. 2, the guide carriers 10 which are guided in the shear columns 3, 4 are provided with stops 24, which are adjustable and either mechanically or hydraulically cushioned. These stops 24, which limit the guide carriers 10 in their downward motion, are mounted on opposite sides of the upper transverse spar 5 of the shear.

When sections, such as I-beams A, are to be cut in the shear, they are centered at the shear by means of rakes 25 which are disposed within the range of the tilting roller table 1 and whose division corresponds to the division of the formed blades. The beams are conveyed by means of the tilting roller tables 1 and 2 into the shear and are lowered into the lower blade beams 17, 18. Above the tilting roller tables 1 and 2 are disposed pressure pulleys (not shown) which can be raised or lowered, so that any section that may not lie flat can, if necessary, be pressed down onto the tilting roller tables 1, 2. Next the upper blade carrier 11 with the upper blade beam 16 is lowered along with the two guide carriers 10 by means of the drive motor 7. At the same time, the upper blade beam 15 is lowered by means of the piston-cylinder units 21 down to the adjustable stops 26.

As soon as the blades in the upper blade beam 16 have reached the web of the section, the upper blade carrier 11 is released from its rigid connection to the guide carriers 10 through de-pressurization of the piston-cylinder units 12. In this way, the guide carriers 10 are prevented by the previously vertically adjusted stops 24 from any further downward motion. The upper blade carriers 11 (with the upper blade beam 16) is now guided on the guide surfaces 27 (which slope at an angle of about 40°) of the stationary guide carriers 10 into the lower dead position, whereby the lower blade beam 17 is taken along by cylindrical guides 31 in the upper blade beam 16. The piston-cylinder units 23 arranged below the lower blade beam 17 acts as retainers. Blade beam 15 is slidably mounted on cylindrical guides 32 extending-upwardly from blade beam 18.

The mentioned cylindrical guides 31 and 32 are located between the upper blade beam 15 or 16 and the associated lower blade beam 18 or 17. The cylindrical guides 31 and 32 consist of guide bolts that are fastened in the lower blade beams 17, 18. The upper blade beams 15, 16 are guided on the guide bolts, preferably by means of ball slides.

Finally, the upper blade beam 15 and the lower blade beam 17 (which oppose each other diagonally) have right-angled locking ledges 29 between the actual blade 28 and the blade beam 15 or 17. By means of these locking ledges 29, the vertical forces occurring at the blades 28 are transmitted to the blade beams 15 or 17. Because of the lowering of the blades arranged in the upper blade beams 16 and 15, the result is reached that the sections A are enclosed by the blades arranged in the pairs of blade beams 16, 17 and 15, 18. A relative motion is produced between the blades arranged in the blade beam pairs 16, 17 and 15, 18 in such a way that there is imparted to the blade beam pair 16, 17 and oblique downwardly-direction motion by means of the upper blade carrier 11 and the sloping guide surfaces 27 in the guide carriers 10.

Furthermore, the shear of the invention is also suitable for cutting of square sections. For this purpose the upper and lower blade beams 15 and 17 (normally used as down-holders or counter-holders) do not have to be provided with the blades 28. A scrap pusher 30 is diagrammatically represented in FIG. 1.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A shear, comprising:
   (a) a frame,
   (b) a guide carrier guided for vertical movement within the frame and having an inclined guide surface,
   (c) a stop for preventing downward movement of the guide carrier beyond a lower position,
   (d) a blade carrier having an inclined guide surface congruent with and slidable on the inclined guide surface of the guide carrier,
   (e) a lower fixed blade beam mounted on the frame,
   (f) an upper movable blade beam fixed to the blade carrier,
   (g) drive means for vertically reciprocating the blade carrier, and
   (h) releasable connecting means for rigidly connecting the blade carrier to the guide carrier so that the blade carrier moves vertically with the guide carrier to said lower position during a first portion of the downward movement of the blade carrier wherein the upper blade beam is brought into cooperating position with respect to the lower blade beam, said releasable connecting means permitting the rigid connection between the blade carrier and the guide carrier and allowing the blade carrier to move obliquely with respect to the guide carrier along said guide surfaces for the remainder of the downward movement of the blade carrier wherein the upper blade beam is moved obliquely relative to the lower bed beam for a shearing operation.

2. A shear as recited in claim 1, wherein the releasable connecting means comprises a pair of piston-cylinder units which are pressurized for rigidly connecting the blade and guide carriers and de-pressurized for release of said rigid connection.

3. A shear as recited in claim 1, wherein for each piston-cylinder unit, the piston is pivotally connected to one of said carriers and the cylinder is pivotally connected to the other of said carriers.

4. A shear as recited in claim 1, wherein the upper blade beam is connected to the blade carrier and the lower blade beam is connected to the frame by means of spring-tension cylinders.

5. A shear as recited in claim 1, wherein said guide surface lie at an inclination of 35° to 45° to the vertical.

6. A shear as recited in claim 1, wherein the stop means is mounted on the frame and includes a cushioning element.

7. A shear as recited in claim 1, wherein the shear is adapted for cutting an I-beam positioned for cutting in the shear so that the web portion of the I-beam is horizontal and wherein said upper and lower blade beams are primary blade beams, said shear comprising:
  (a) a secondary upper blade beam mounted within the frame adjacent the primary upper blade beam and above the primary lower blade beam,
  (b) first guide means for enabling the secondary upper blade beam to move vertically relative to the primary lower blade beam,
  (c) additional drive means for lowering the secondary upper blade beam concurrently with the lowering of the primary upper blade beam during said first poriton of the downward movement of the blade carrier,
  (d) a secondary lower blade beam mounted within the frame adjacent the primary lower blade beam and beneath the primary upper blade beam,
  (e) second guide means for enabling the primary upper blade beam to move downwardly relative to the secondary lower blade beam during said first portion of the downward movement of the blade carrier so that the primary upper blade beam and the secondary lower blade beam move concurrently obliquely relative to the other blade beams during the remaining portion of the downward movement of the blade carrier, whereby relative movement between the primary blade beams shears the web portion of the I-beam, relative movement between the two upper blade beams shears the upwardly extending flanges of the I-beam and relative movement between the two lower blade beams shears the downwardly extending flanges of the I-beam.

8. A shear as recited in claim 7, wherein the second guide means comprises:
  (a) a shear post extending upwardly from the secondary blade beam on which the primary upper blade beam is slidably mounted, and
  (b) means for supporting the secondary blade beam.

9. A shear as recited in claim 8, wherein the means for resiliently supporting the secondary blade beam is a piston-cylinder unit.

10. A shear as recited in claim 7, wherein the first guide means comprises a guide post extending from the primary lower blade beam on which the secondary upper blade beam is slidably mounted.

* * * * *